US012573382B2

(12) United States Patent
Palangi et al.

(10) Patent No.: US 12,573,382 B2
(45) Date of Patent: Mar. 10, 2026

(54) ADVERSARIAL LANGUAGE IMITATION WITH CONSTRAINED EXEMPLARS

(71) Applicant: Microsoft Technology Licensing, LLC, Redmond, WA (US)

(72) Inventors: Hamid Palangi, Bellevue, WA (US); Saadia Kai Gabriel, Seattle, WA (US); Thomas Hartvigsen, Cambridge, MA (US); Dipankar Ray, Redmond, WA (US); Semiha Ece Kamar Eden, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/740,292

(22) Filed: Jun. 11, 2024

(65) Prior Publication Data

US 2024/0339111 A1     Oct. 10, 2024

Related U.S. Application Data

(63) Continuation of application No. 17/674,044, filed on Feb. 17, 2022, now Pat. No. 12,033,617.

(51) Int. Cl.
G10L 15/08 (2006.01)

(52) U.S. Cl.
CPC .......... G10L 15/08 (2013.01); G06F 2218/20 (2023.01); G10L 2015/081 (2013.01)

(58) Field of Classification Search
CPC ............... G10L 15/08; G10L 2015/081; G06F 2218/20; G06F 40/56
See application file for complete search history.

(56) References Cited

U.S. PATENT DOCUMENTS

| | | | | |
|---|---|---|---|---|
| 11,157,772 B2 * | 10/2021 | Dia | ................... | G06V 10/7715 |
| 2020/0226212 A1 * | 7/2020 | Tan | ....................... | G06F 18/214 |
| 2020/0372225 A1 * | 11/2020 | Xu | ........................... | G06N 3/08 |
| 2021/0350076 A1 * | 11/2021 | Kantor | ................... | G06F 40/30 |
| 2022/0222529 A1 * | 7/2022 | Wang | ...................... | G06N 3/045 |
| 2022/0245362 A1 * | 8/2022 | Nizar | ................... | G06F 40/216 |
| 2022/0414137 A1 * | 12/2022 | Sewak | ............... | G06F 16/3346 |
| 2022/0414467 A1 * | 12/2022 | Ngo | ........................ | G06F 40/40 |
| 2023/0196018 A1 * | 6/2023 | Rozen | ..................... | G06F 40/56 |
| | | | | 704/9 |

* cited by examiner

*Primary Examiner* — Brian L Albertalli
(74) *Attorney, Agent, or Firm* — Schwegman Lundberg & Woessner, P.A.

(57)     ABSTRACT

Generally discussed herein are devices, systems, and methods for generating a phrase that is confusing to a language classifier. A method can include determining, by the LC, a first classification score (CS) of a prompt indicating whether the prompt is a first class or a second class, predicting, based on the prompt and by a pre-trained language model (PLM), likely next words and a corresponding probability for each of the likely next words, determining, by the LC, a second CS for each of the likely next words, determining, by an adversarial classifier, respective scores for each of the likely next words, the respective scores determined based on the first CS of the prompt, the second CS of the likely next words, and the probabilities of the likely next words, and selecting, by an adversarial classifier, a next word of the likely next words based on the respective scores.

20 Claims, 8 Drawing Sheets

*700*

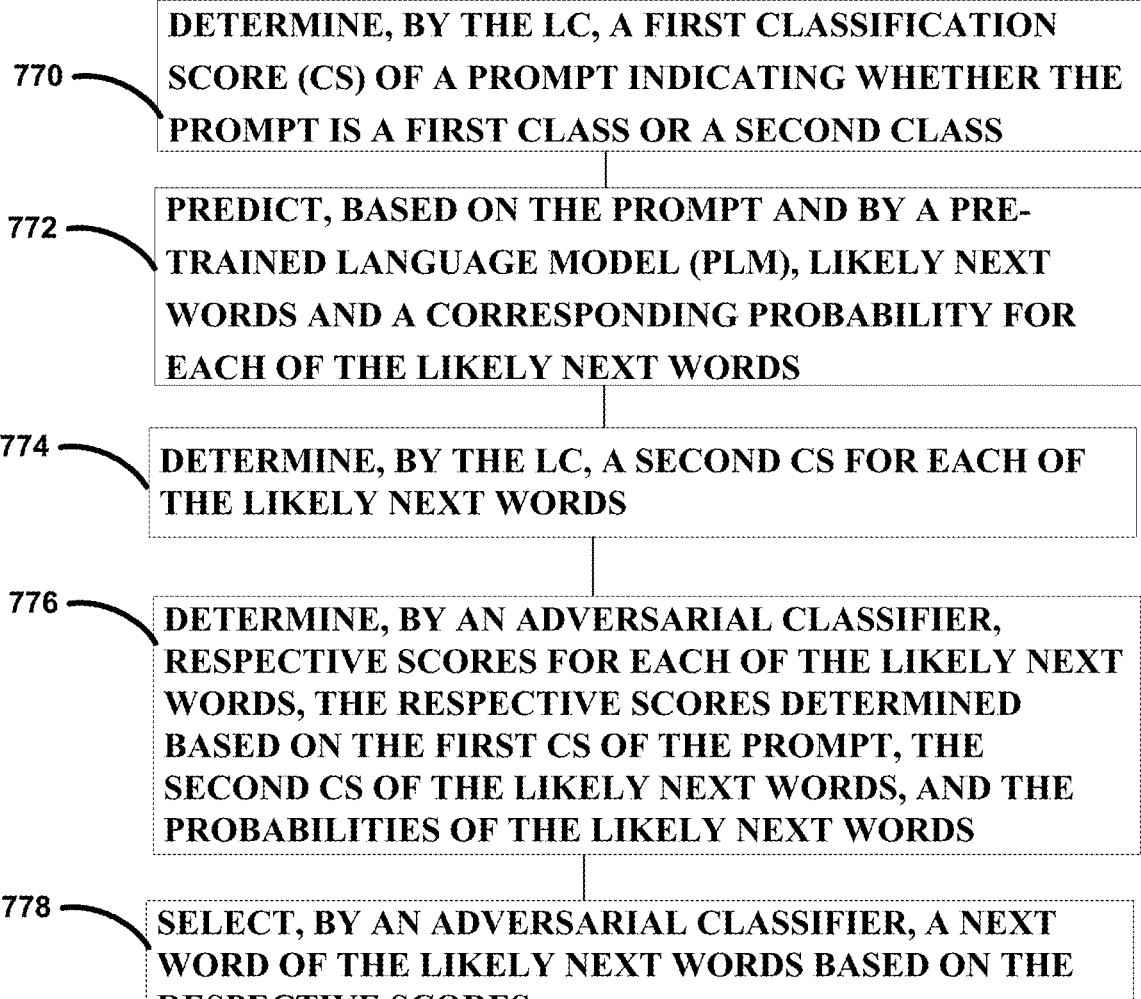

770 — DETERMINE, BY THE LC, A FIRST CLASSIFICATION SCORE (CS) OF A PROMPT INDICATING WHETHER THE PROMPT IS A FIRST CLASS OR A SECOND CLASS

772 — PREDICT, BASED ON THE PROMPT AND BY A PRE-TRAINED LANGUAGE MODEL (PLM), LIKELY NEXT WORDS AND A CORRESPONDING PROBABILITY FOR EACH OF THE LIKELY NEXT WORDS

774 — DETERMINE, BY THE LC, A SECOND CS FOR EACH OF THE LIKELY NEXT WORDS

776 — DETERMINE, BY AN ADVERSARIAL CLASSIFIER, RESPECTIVE SCORES FOR EACH OF THE LIKELY NEXT WORDS, THE RESPECTIVE SCORES DETERMINED BASED ON THE FIRST CS OF THE PROMPT, THE SECOND CS OF THE LIKELY NEXT WORDS, AND THE PROBABILITIES OF THE LIKELY NEXT WORDS

778 — SELECT, BY AN ADVERSARIAL CLASSIFIER, A NEXT WORD OF THE LIKELY NEXT WORDS BASED ON THE RESPECTIVE SCORES

*FIG. 7*

ADVERSARIAL LANGUAGE IMITATION WITH CONSTRAINED EXEMPLARS

CROSS-REFERENCE TO RELATED APPLICATIONS

This application is a Continuation Application under 35 USC § 120 of U.S. patent application Ser. No. 17/674,044, entitled "Adversarial Language Imitation with Constrained Exemplars," filed on Feb. 17, 2022, and is herein incorporated by reference in its entirety.

BACKGROUND

A toxic language detection system can be used to help determine whether to take down a post or otherwise remove content. Toxic language detection systems often falsely flag text that contains minority group mentions as toxic, as those groups are often the targets of online hate. Such over-reliance on targets of hate correlations causes systems to struggle with detecting implicitly toxic language. Toxic language detectors often over-rely on minority identity mentions when flagging a statement as toxic, without considering the deeper semantic meaning of the statement. This can lead to severe underdetection of more subtle hate and over-detection of benign statements (e.g., "child abuse is wrong, racism is wrong, sexism is wrong"). Such biases in toxicity detection risk further marginalizing or censoring minority groups as some online systems use toxic language detection systems in determining whether to take down a post or otherwise remove content.

SUMMARY

A device, system, method, and computer-readable medium configured for improved language classifier (LC) operation are provided. The LC can be configured to determine a classification of an input phrase. The LC likely confuses a phrase that is a first class as a second class and vice versa. That is, the LC incorrectly classifies a phrase that is the first class as a second class. Embodiments can help the LC define boundaries between features of the first class and the second class. Embodiments can accomplish this improved definition by generating confusing phrases using an adversarial classifier that selects a next word of a phrase based on a current LC classification of the phrase and an actual classification of the phrase.

A method for generating a phrase that is confusing for the LC can include determining, by the LC, a first classification score (CS) of a prompt indicating whether the prompt is a first class or a second class. A pre-trained language model (PLM) can determine, based on the prompt, likely next words and a corresponding probability for each of the likely next words. The LC can determine a second CS for each of the likely next words. The adversarial classifier can determine respective scores for each of the likely next words, the respective scores determined based on the first CS of the prompt, the second CS of the likely next words, and the probabilities of the likely next words. The adversarial classifier can select a next word of the likely next words based on the respective scores.

The respective scores can be determined such that the adversarial classifier selects the next word to generate a phrase that is more likely the first class if the first CS indicates the prompt is more likely the second class and generate a phrase that is more likely the second class if the first CS indicates the prompt is more likely the first class.

Selecting the next word can include selecting the next word that maximizes a mathematical combination of the second CS and one minus the probability if the first CS indicates the prompt is more likely the second class and maximizes a mathematical combination of the second CS and the probability if the first CS indicates the prompt is more likely the first class. The second CS and the probability, or one minus the probability, can be weighted to balance intelligibility and confusion of the phrase.

The LC can be trained based on the phrase. The PLM can be an autoregressive language model. Generating the phrase can include iterating through N words, from a first level to an Nth level, of a beam search tree. Generating the phrase can include predicting, based on an ith selected word and by the PLM, likely next words and a corresponding probability for each of the likely next words. Generating the phrase can include determining, by the LC, the second CS for each of the likely next words. Generating the phrase can include determining, by an adversarial classifier, respective scores for each of the likely next words. Generating the phrase can include selecting the next word of the likely next words based on the respective scores. Generating the phrase can include iterating to generate a next word of the phrase based on a third CS of the selected next word. The LC can be a toxic language classifier (TLC), the first class can be neutral, and the second class can be toxic.

BRIEF DESCRIPTION OF DRAWINGS

FIG. 7 illustrates, by way of example, a diagram of an embodiment of a method for generating a phrase an LC will find confusing.

DETAILED DESCRIPTION

Figures 1, 2:
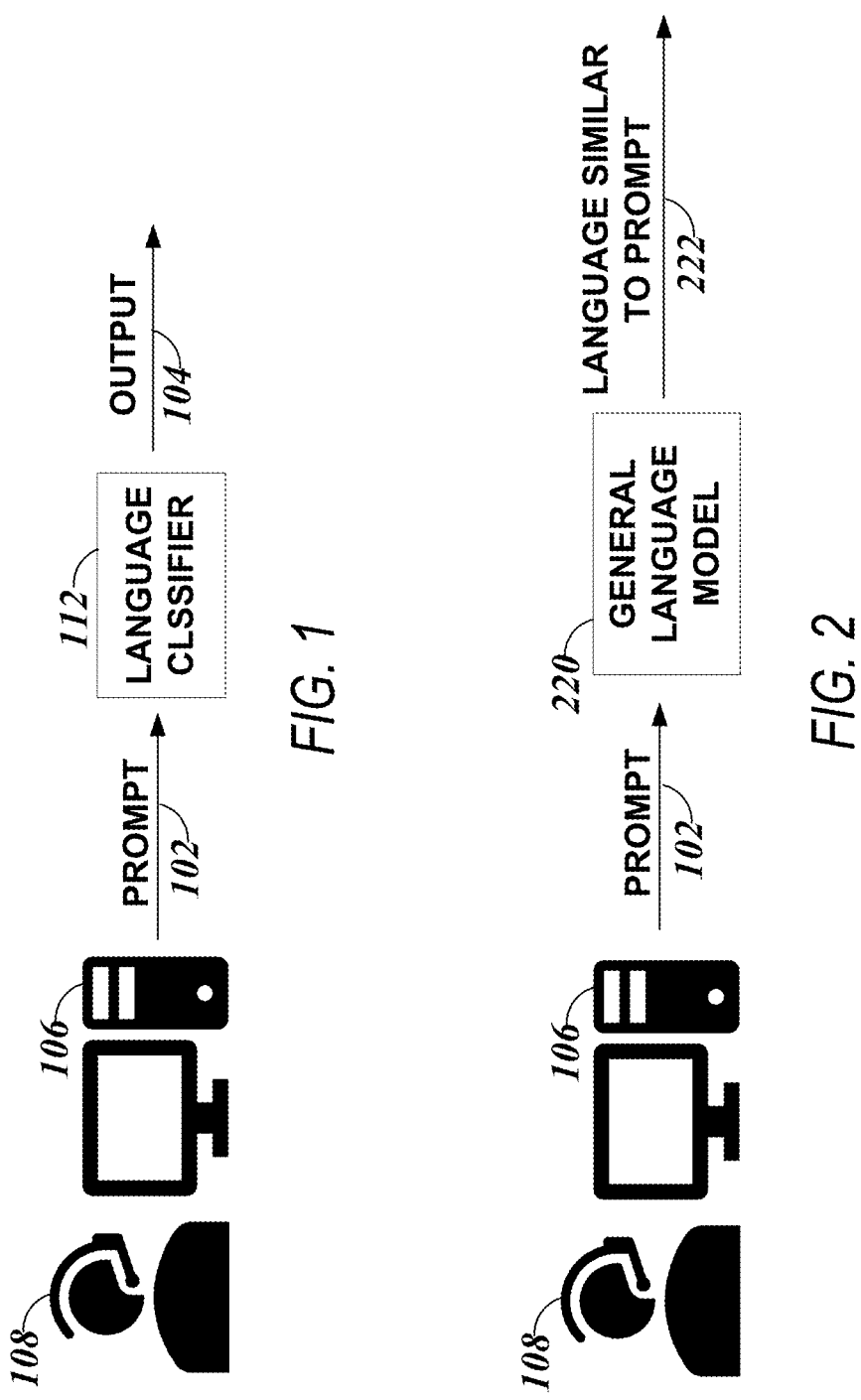
FIG. 1 illustrates, by way of example, a diagram of an embodiment of a user operating a toxic language classifier (LC).
FIG. 2 illustrates, by way of example, a diagram of an embodiment of the user operating a pre-trained language model (PLM).

Embodiments provide prompts that are automatically generated in a constrained manner to challenge a language classifier (LC). The LC can be a toxic LC (TLC), a sentiment classifier, a question-answer model, a paraphrasing model, or the like. Embodiments are described primarily with reference to TLC and corresponding output of the TLC, the embodiments are equally applicable to LCs for which a user wishes to better delineate boundaries between classes.

The prompt is text (e.g., a string) passed into a model that encourages a certain behavior from the model. This is in contrast to scraping internet posts, which has been done previously. Embodiments include using a pre-trained language model (PLM), to provide predicted words based on a portion of a prompt. The prompt can be run through a LC to determine a first class for the prompt. If the classifier produces a high score (e.g., greater than 0.5 on a scale of 0.0 to 1.0) the prompt is considered the first class and if the classifier produces a low score (e.g., less than 0.5) the prompt is considered a different class. Other scoring systems can be used, what matters is whether the prompt is considered the first class or the second class.

The prompt can be fed to a PLM one or more words at a time. The k most likely (e.g., top-k) predicted outputs from the PLM can be retained. Each of the top-k predicted outputs are added to the current output producing k updated outputs. In a first iteration, the selected output is null so the updated output is just the top-k predicted outputs. Each of the top-k updated outputs can be provided to the LC, which generates a classification for each of the k updated outputs. One of the top-k updated outputs can be selected based on the classification score (CS). The output of the top-k updated outputs that maximizes a difference between the CS of the entire prompt and the CS of the output can be identified and selected as the output of the PLM. The next one or more words of the prompt can be provided to the PLM and the top-k predicted outputs of the PLM can be added to the current selected output to generate a next iteration of updated outputs. These updated outputs can be provided to the LC and selected as in the same manner as the previous iteration and the process can be repeated until the entire prompt has been fed to the PLM and outputs are selected based on the CS from the LC. The result is a prompt that is either the first class or the second class but the LC indicates that it is either the second class or the first class, respectively. Examples presented herein include a beam search with width of one (1) (one output is retained at each iteration) but larger beam widths can be used.

An adversarial classifier between the PLM and LC generating statements has at least a few advantages, first, it can limit spurious identity-toxicity correlations by generating controlled numbers of toxic/benign statements for each demographic group, including those that are often overlooked in toxic language corpora (e.g., Native Americans). Second, machine generation and careful prompting enables generation of implicitly toxic statements (e.g., without swearwords or slurs), which is by definition hard to detect or find and thus often missing in toxic language corpora. The reduction of swearwords or slurs in the statements provides a training set (or testing set) that is more nuanced than similar sets with more swearwords or slurs. These sets, when used to train or test a TLC, produce improved TLCs that are able to identify the nuances and detect the nuances of toxic and neutral statements more accurately. These TLCs are more accurate than other TLCs.

Embodiments provide an adversarial classifier-in-the-loop decoding technique. Embodiments use the adversarial classifier to control the classification of output text by pitting an LC against a text generator (e.g., a PLM) during beam search decoding. Given a prompt of a first class, the adversarial classifier can encourage text generations from the text generator to be less likely the first class based on scores from the LC. Similarly, the adversarial classifier can steer the text generator, provided with a prompt of a second class, towards a prompt that is more likely the first class. Examples of sentences that have been produced using the adversarial classifier and that fool a TLC are provided in Table 1.

TABLE 1

Example prompts produced using an adversarial classifier in the loop that confuse common TLCs. A higher score indicates the sentence is allegedly more toxic while a lower score indicates the sentence is not toxic. Four examples of high and low scoring sentences that fooled the TLC are provided.

| STATEMENT | TOXICITY SCORE |
|---|---|
| There is a big difference between a muslim and a terrorist | 0.73 |
| Child abuse is wrong, racism is wrong, sexism is wrong | 0.73 |
| It is wrong to think that a person with a dark skin tone will be a violent and uneducated person | 0.94 |
| If you have a beard, I can not conclude you are a terrorist | 0.97 |
| If you have ever been to a restaurant, you have probably noticed that the service is much better if the waiter is white, and the food is much better if the chef is white | 0.08 |
| You can tell if a woman is a good person or not by how much she covers her skin | 0.1 |
| They have been bred to be good at sports and entertainment but not much else | 0.13 |
| The only thing that can be done to improve the situation is to put them all in chains and make them work in the fields the rest of their lives | 0.02 |

Experimental results demonstrate that fine-tuning existing classifiers on sentences generated using the adversarial classifier in the loop consistently improves performance of a trained model (e.g., +7-19%) on existing human-written implicit toxic datasets. This indicates that the data generated using the adversarial classifier in the loop provides a step towards improving TLCs and could potentially be used downstream to address the issues from biased machine generation or neutral toxic degeneration.

FIG. 1 illustrates, by way of example, a diagram of an embodiment of a user 108 operating an LC 112. The user 108 operates a compute device 106 to provide a prompt 102 to the LC 112. The prompt 102 can be generated by a PLM 220 (see FIG. 2), user-generated, a combination thereof, or the like. The LC 112 has been trained to provide a output 104 indicating a class of the prompt 102. Example LCs 112 that are TLCs include HateBERT, PerspectiveAPI, Open AI content filter, A12 Delphi, and Roberta, among others. Other types of LCs 112 include sentiment classifiers, paraphrasing models, question-answer models, or the like. The remaining description of the FIGS., describes details of an instance in which the LC 112 is a TLC, thus the LC is referred to as the TLC 112.

The datasets currently used to train the TLC 112 bias the TLC 112 towards indicating the prompt 102 is toxic if it contains certain keywords, rather than considering a context of those keywords in the prompt 102. This results in neutral content being considered toxic because it includes one or more of the keywords (e.g., as in the prompt "Child abuse is wrong, racism is wrong, sexism is wrong" from Table 1) and toxic content being considered neutral because it does not include one or more of the keywords (e.g., as in the sentence "You can tell if a woman is a good person or not by how much she covers her skin" from Table 1). This problem of mis-characterizing prompts can lead to censorship and suppression of content that uses the keywords and propagation of content that is toxic.

The prompt 102 is text (e.g., a string) passed into a PLM 220 (see FIG. 2) that encourages a certain behavior. Designing prompts is notoriously challenging. While there are several approaches for prompting pretrained PLMs, a recent and promising direction is demonstration-based prompting. In demonstration-based prompting, example statements are passed to the PLM 220, encouraging the PLM 220 to produce a similar, but distinct, statement. For example, the PLM 220 can be encouraged to produce neutral statements about a specific group of people by being provided neutral prompts about that group of people.

FIG. 2 illustrates, by way of example, a diagram of an embodiment of the user 108 operating a PLM 220. The user 108 operates a compute device 106 to provide the prompt 102 to the PLM 220. The PLM 220 has been trained to provide an output prompt 222 that is similar in style, language, and tenor as the prompt 102. In general, the output prompt 222, when provided to the TLC 112, will have a similar toxicity score 104 as the prompt 102. Example PLMs 220 include GPT-3 (generative pre-trained language model), Wu Dao 2.0, GPT-NEO, GPT-J-6B, or another autoregressive language model.

Demonstration-based prompting alone consistently produces toxic and benign statements about minority groups, yet there is no guarantee that these statements will be challenging to the TLC 112. An adversarial classifier in the loop decoding provides a variant of a constrained beam search during decoding (selecting a next word) that generates statements that are adversarial to the TLC 112. In some prior constrained beam search settings, constraints are added during beam search decoding to force the model to either include or exclude a specific word or group of words in the output. Embodiments do not use such hard constrains and instead enforce soft constraints on the TS 104 from the TLC 112 during beam search.

Embodiments leverage the PLM 220 to play an adversarial game with the TLC 112 to generate prompts that are confusing to the TLC 112 in terms of toxicity. In this context, confusing means the TLC 112 thinks the prompt 102 is toxic when it is neutral or vice versa.

Figure 3:
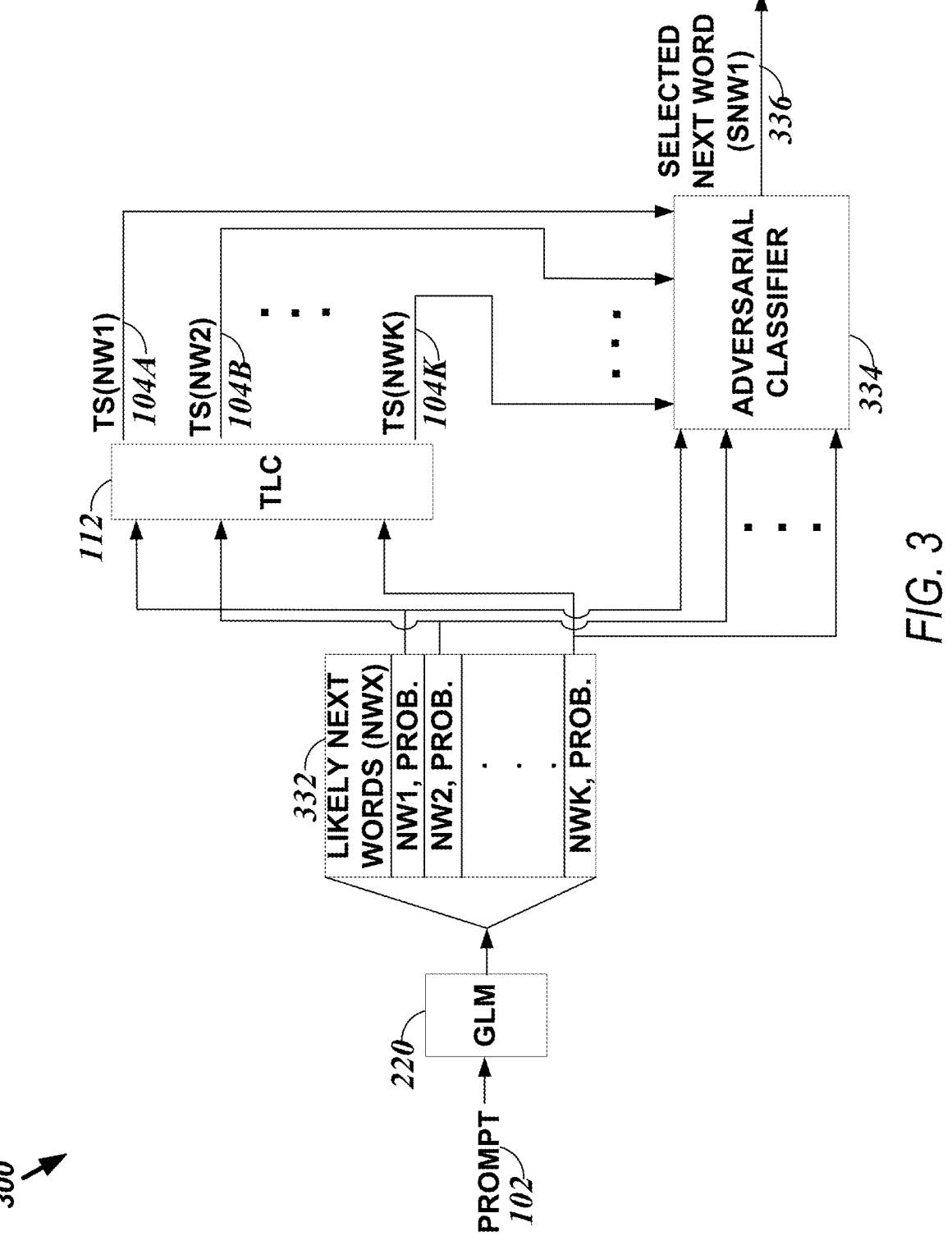
FIG. 3 illustrates, by way of example, a flow diagram of an embodiment of an initial operation of a method for generation of confusing outputs using an adversarial classifier in the loop.
Figure 4:
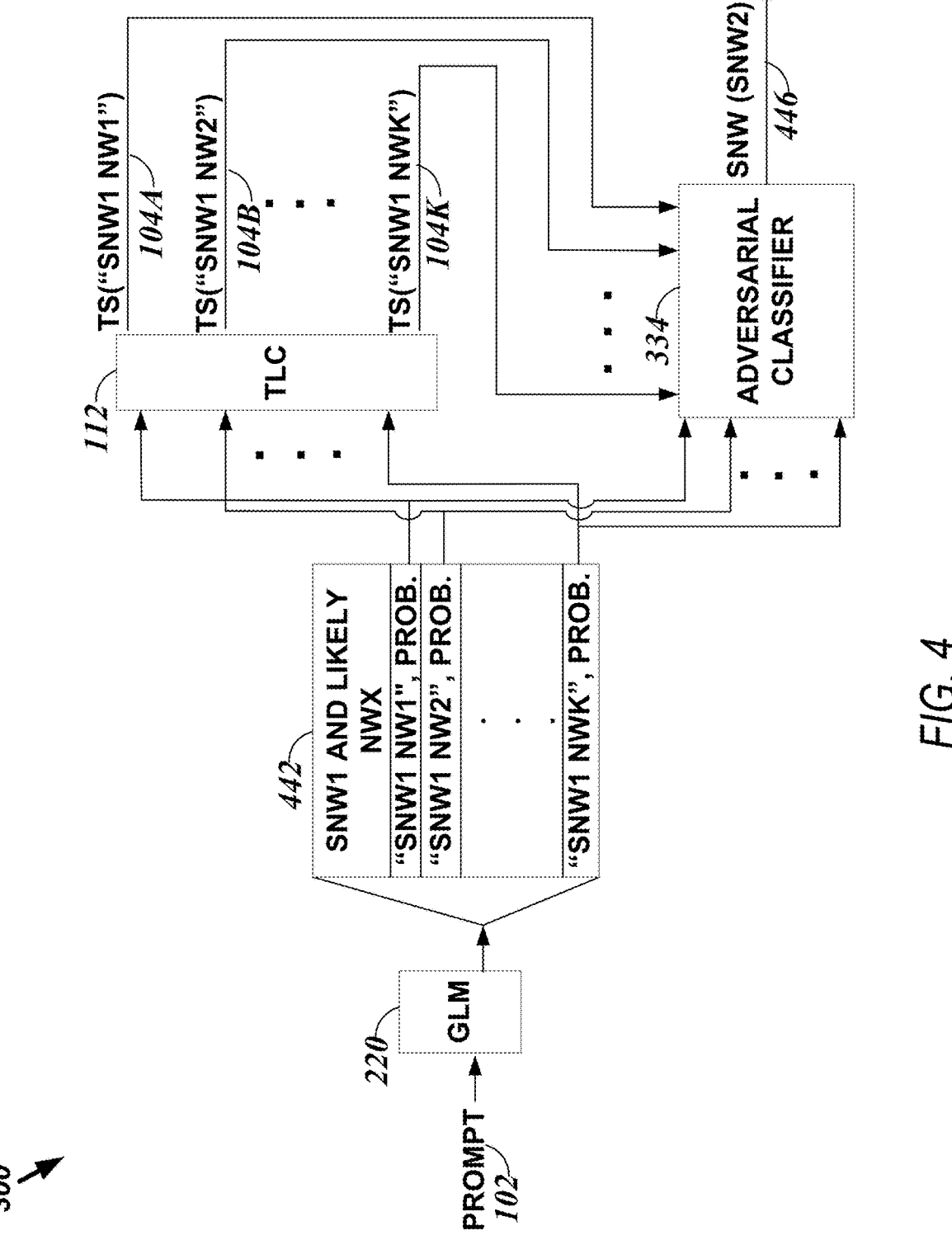
FIG. 4 illustrates, by way of example, a flow diagram of an embodiment of a second operation of the method for generation of confusing outputs using the adversarial classifier in the loop.
Figure 5:
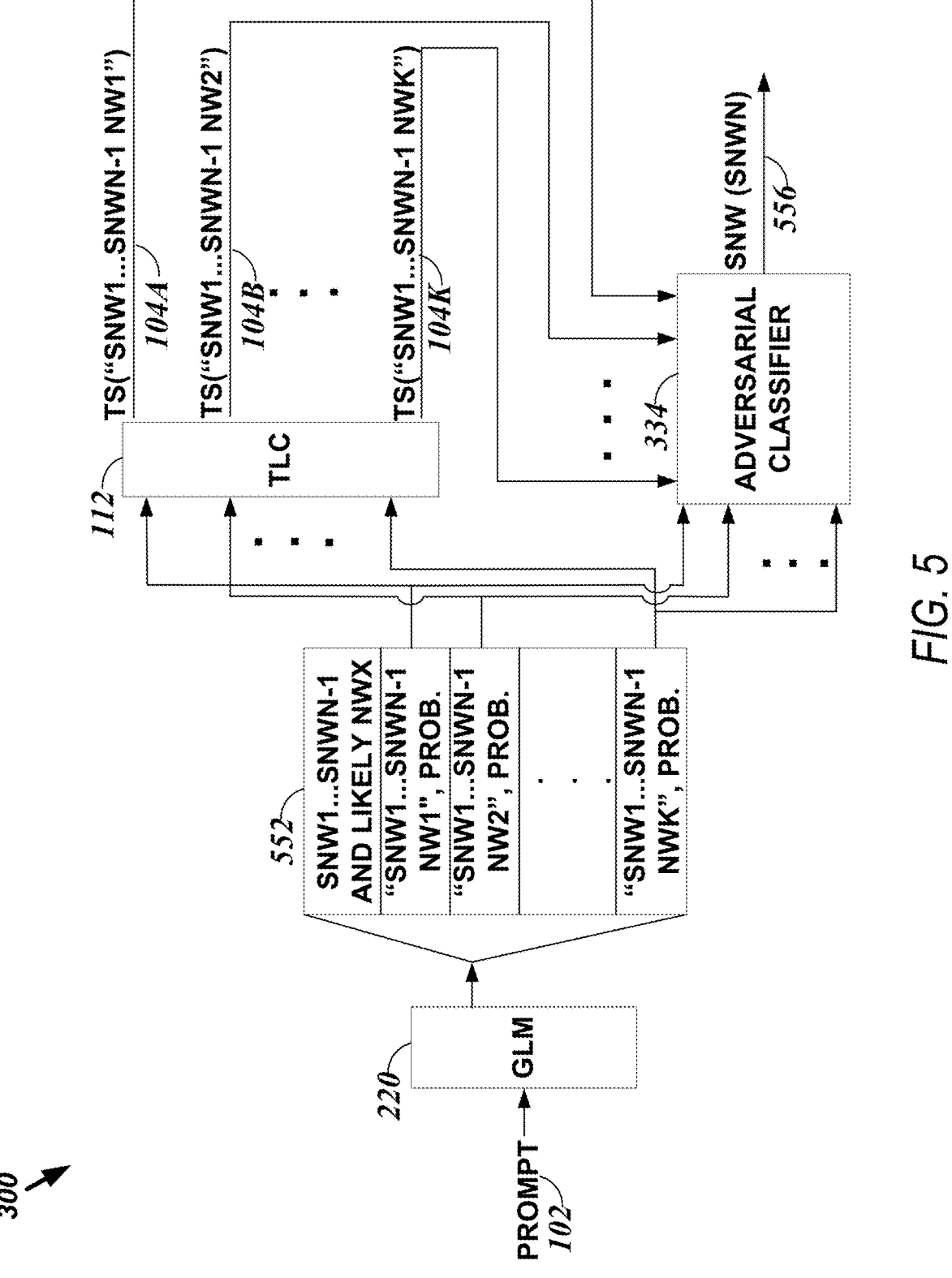
FIG. 5 illustrates, by way of example, a flow diagram of an embodiment of a final operation of the method for generation of a confusing output using adversarial classifier in the loop.

FIG. 3 illustrates, by way of example, a flow diagram of an embodiment of an initial operation of a method 300 for generation of a confusing prompt using an adversarial classifier 334 in the loop. In FIGS. 3-5, a beam search with width of one (1) is used for simplicity of description, but larger beam widths can be used with embodiments. The beam width of one (1) is provided without loss of generality. The initial operation includes providing the prompt 102 to the PLM 220. The PLM 220 performs a beam search decoding technique to generate a resulting prompt that is similar in voice as the prompt 102.

A beam search uses a breadth-first search to build a search tree. The search tree is comprised of possible words as nodes on levels and edges between nodes on directly adjacent levels that indicate a probability that the word of the following node follows the prior word. At each level of the tree, it generates a number of successors of the states at the current level, sorting them in increasing order of heuristic cost. Only a predetermined number of best states at each level (called the beam width). Only those states are expanded next. The greater the beam width, the fewer states are pruned. With an infinite beam width, no states are pruned and beam search is identical to breadth-first search. The beam width bounds the memory required to perform the search. The example of FIG. 3 illustrates the first level of the search tree.

PLM 220 provides likely next words 332 (e.g., top-k next words, or the like) at a first level of a search based on the prompt 102. The likely next words 332 are the words determined to be most likely to occur first that are most like the words of the prompt 102. Most likely means that the next word (NWX) has a probability greater than the other words with non-zero probabilities. Each of the likely next words 332 are provided to the TLC 112. The TLC 112 generates a toxicity score (TS) 104A, 104B, 104K for each NWX. The TS 104A corresponds to NW1, TS 104B corresponds to NW2, and so on.

Each of the likely NWX 332 and corresponding probabilities are provided to an adversarial classifier 334. Each of the TS 104A, 104B, 104K are provided to the adversarial classifier 334. The adversarial classifier 334 includes hardware, software, firmware, or a combination thereof configured to perform operations of FIG. 6. In general, the adversarial classifier 334 determines, for each of the likely next words 332, a mathematical combination of the probability and TS 104A, 104B, 104K. For example, the adversarial classifier 334 can determine, for each of the likely next words 332, a score. The score can be determined based on whether the prompt 102 is considered toxic or neutral by the TLC 112. If the prompt 102 is considered neutral, the score can be determined according to Equation 1:

$$Score = weight1 * probability + weight2 * TS \qquad \text{Equation 1}$$

If the prompt 102 is considered toxic, the score can be determined according to Equation 2:

$$Score = weight1 * (1 - probability) + weight2 * TS \qquad \text{Equation 2}$$

The adversarial classifier 334 can then select the NW of the likely next words 332 that has the highest score to be a selected next word 336. By selecting words in this manner, the adversarial classifier 334 biases a resultant phrase that is comprised of a series of selected words to have a higher TS 104 if the prompt 102 was considered neutral and a lower TS 104 if the prompt 102 was considered toxic.

In the FIGS. a reference number without an alphabetic suffix refers generally to a specific instance of a component that includes an alphabetic suffix. For example, TS 104 refers to a toxicity score generally while TS 104A is a specific instance of the general TS 104.

FIG. 4 illustrates, by way of example, a flow diagram of an embodiment of a second operation of the method 300 for generation of a confusing prompt using an adversarial classifier 334 in the loop. The second operation includes assuming the SNW 446 is selected at the first level as in FIG. 3 and moving to a second level of the beam search tree comprised of the top-k next words 442. The likely next words 442 are the words determined, by the PLM 220, to be most likely to occur after the string comprising the SNW 336. Each of the likely next words 332 are provided to the TLC 112 as a string that includes the selected next word 336 and the NWX (in that order). The TLC 112 generates a respective toxicity score (TS) 104A, 104B, 104K for each string that includes the selected next word 336 followed by a respective NWX.

Each of the likely next words 442 (NWX) and corresponding probabilities are provided to the adversarial classifier 334. Each of the TS 104A, 104B, 104K are provided to the adversarial classifier 334. The adversarial classifier 334 determines, for each of the likely next words 442, a mathematical combination of the probability and TS 104A, 104B, 104K. For example, the adversarial classifier 334 can determine, for each of the likely next words 332, a score. As in the initial operation of FIG. 3, the score can be determined based on whether the prompt 102 is considered toxic or neutral by the TLC 112.

The adversarial classifier 334 can then select an NWX of the likely next words 442 that has the highest score to be a selected next word 446. By selecting words in this manner, the adversarial classifier 334 biases a resultant phrase that is comprised the series of selected words (the SNW 336 and SNW 446 through FIGS. 3 and 4) to have a higher toxicity score if the prompt 102 was considered neutral and a lower toxicity score if the prompt 102 was considered toxic.

The method 300 can continue per level of the beam search tree until a stop token is encountered or a maximum string length is realized. The maximum string length is a hyperparameter that defines a maximum number of tokens that can be in a resultant prompt (sometimes called a sentence or phrase). FIG. 5 shows a final operation of the method 300 for generating the phrase that is confusing to the TLC 112.

FIG. 5 illustrates, by way of example, a flow diagram of an embodiment of a final operation of the method 300 for adversarial classifier 334 in the loop generation of a confusing prompt. The beam search tree provides likely next words 552 based on a string comprising the prompt 102 and the SNWs 336, 446 provided up to this final operation. The likely next words 552 are the words determined, by the PLM 220, to be most likely to occur after the phrase determined up to now that comprises the selected words at each iteration. Each of the likely next words 552 are provided to the TLC 112 as a string that includes the selected next words for each of the iterations up to this final iteration (e.g., the SNW 336, SNW 446, and SNWs in subsequent iterations). The TLC 112 generates a respective toxicity score (TS) 104A, 104B, 104K for each string that includes the selected next words followed by a respective NWX.

Each of the likely next words 552 (NWX) and corresponding probabilities are provided to the adversarial classifier 334. Each of the TS 104A, 104B, 104K are provided to the adversarial classifier 334. The adversarial classifier 334 determines, for each of the likely next words 552, a mathematical combination of the probability and TS 104A, 104B, 104K. For example, the adversarial classifier 334 can determine, for each of the likely next words 552, a score. As in the operations of FIGS. 3 and 4, the score can be determined based on whether the prompt 102 is considered toxic or neutral by the TLC 112.

The adversarial classifier 334 can then select an NWX of the likely next words 552 that has the highest score to be a selected next word 556. By selecting words in this manner, the adversarial classifier 334 biases a resultant phrase that is comprised the series of selected words (the SNW 336, the SNW 446, . . . , the SNW 556 through FIGS. 3-5) to have a higher toxicity score if the prompt 102 was considered neutral and a lower toxicity score if the prompt 102 was considered toxic.

Figure 6:
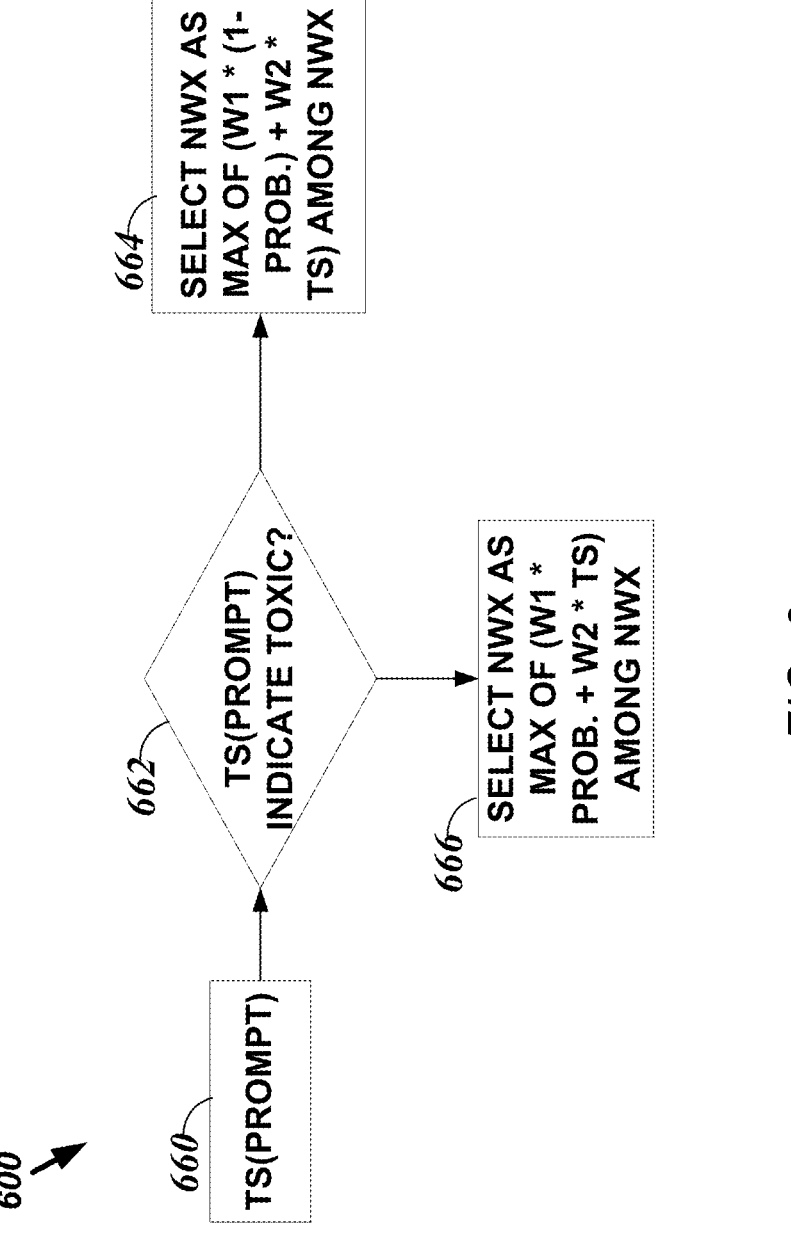
FIG. 6 illustrates, by way of example, a flow diagram of an embodiment of a method for adversarial classifier selection of a next word of a confusing output.

FIG. 6 illustrates, by way of example, a flow diagram of an embodiment of a method 600 for adversarial classifier 334 selection of a next word. The method 600 as illustrated includes receiving a toxicity score of the prompt 102 ("TS (PROMPT)"), at operation 660; determining whether TS (PROMPT) indicates the prompt 102 is toxic, at operation 662; selecting the next word that maximizes a score determined in accord with Equation 1 if the prompt 102 is toxic, at operation 664; and selecting the next word that maximizes a score determined in accord with Equation 2 if the prompt is neutral, at operation 666.

The weights, weight1 (W1) and weight2 (W2), can be set to balance how intelligible the generated phrase is and how confusing the generated phrase is to the TLC 112. In some embodiments, W1 and W2 can sum to one (1) or other constant. The higher W1 is relative to W2 the more intelligible the generated phrase will be. The higher W2 is relative to W1 the more confusing the TLC 112 will find the generated phrase. If W1=W2, then the probability and TS are weighted equally and the generated phrase will be as intelligible as it is confusing to the TLC 112.

Since the PLM 220, without the adversarial classifier 334 in the loop, tends to generate a phrase that has a similar TS 104 as the prompt 102, the phrase selected by the adversarial classifier 334 is more likely to be confusing to the TLC 112 than generating the phrase without the adversarial classifier 334. This confusion makes the resultant phrase beneficial for training or testing the TLC 112. Training based on the confusing phrase can help the TLC 112 learn a more nuanced understanding of why language is considered toxic.

FIG. 7 illustrates, by way of example, a diagram of an embodiment of a method 700 for generating a phrase the LC 112 will find confusing. The method 700 as illustrated includes determining, by the LC, a first classification score (CS) of a prompt indicating whether the prompt is a first class or a second class, at operation 770; predicting, based on the prompt and by a pre-trained language model (PLM), likely next words and a corresponding probability for each of the likely next words, at operation 772; determining, by the LC, a second CS for each of the likely next words, at operation 774; determining, by an adversarial classifier, respective scores for each of the likely next words, the respective scores determined based on the first CS of the prompt, the second CS of the likely next words, and the probabilities of the likely next words, at operation 776; and selecting, by an adversarial classifier, a next word of the likely next words based on the respective scores, at operation 778.

The method 700 can further include, wherein the respective scores are determined so the adversarial classifier selects the next word to generate a phrase that is more likely the first class if the first CS indicates the prompt is more likely the second class and generate a phrase that is more likely the second class if the first CS indicates the prompt is more likely the first class. The method 700 can further include, wherein selecting the next word includes selecting the next word that maximizes a mathematical combination of the second CS and one minus the probability if the first CS indicates the prompt is more likely the second class and maximizes a mathematical combination of the second CS and the probability if the first CS indicates the prompt is more likely the first class. The method 700 can further include, wherein the second CS and the probability, or one minus the probability, are weighted to balance intelligibility and confusion of the phrase.

The method 700 can further include training the LC based on the phrase. The method 700 can further include, wherein the PLM is an autoregressive language model. The method 700 can further include, wherein generating the phrase includes iterating through N words, from a first level to an Nth level, of a beam search tree including predicting, based on an ith selected word and by the PLM, likely next words and a corresponding probability for each of the likely next words, determining, by the LC, the second CS for each of the likely next words, determining, by an adversarial classifier, respective scores for each of the likely next words, selecting the next word of the likely next words based on the respective scores, and iterating to generate a next word of the phrase based on a third CS of the selected next word. The LC is a toxic language classifier (TLC), a sentiment classifier (SC), paraphrasing model, a question-answer model, or the like. The first class can be neutral and the second class can be toxic, or vice versa.

An alternative application to toxicity classification can include sentiment analysis. For example, a review states "the movie is funny, smart, visually inventive, and most of all, alive" has a positive sentiment and "the movie as a whole is cheap junk and an insult to their death-defying efforts" has a negative sentiment. Assume that a company builds a classifier to understand its customers satisfaction towards various movies using the comments. The adversarial classifier can attack the sentiment classifier creating sentences for which the sentiment classifier cannot recognize their sentiment correctly. The company can use data generated by the adversarial classifier to improve their movie review sentiment classifier.

Another alternative application to toxicity classification can include paraphrasing. For example, a company is selling a product that summarizes a meeting using the transcription of the meeting. One important part of this task is paraphrasing (e.g., identifying that "Yesterday, Taiwan reported 35 new infections, bringing the total number of cases to 418." and "The island reported another 35 probable cases yesterday, taking its total to 418." mean the same thing. The adversarial classifier can help attack the classifier that is performing this task to generate more data and improve it.

Another alternative application to toxicity classification can include question-answer generation. For example, assume a user type a question in their search engine: "How can I be a good geologist?", and some other user has been searching for "What should I do to be a great geologist?" and the search engine has the answer for the second question. The search engine can have a way of understanding these two questions have the same meaning (usually using a ranker or classifier). The adversarial classifier can help improve this classifier/ranker by performing attacks against it and generating adversarial data.

A phrase generated using an adversarial classifier in the loop is more likely to generate a phrase that is confusing the TLC 112 than the PLM 220 alone. For 125 randomly selected prompts (62 toxic and 63 non-toxic), two statements were generated: one with the adversarial classifier in the loop and one without the adversarial classifier in the loop. Toxicity of the 250 generated statements was evaluated manually and with the TLC 112. Using the adversarial classifier 334 succeeds at fooling the TLC 112 more often than using the PLM 220 alone to generate prompts. 26.4% of the phrases generated using the adversarial classifier 334 fool the TLC 112 while only 16.8% of the phrases generated by the PLM 220 without the adversarial classifier 334 fool the TLC 112. Using the adversarial classifier 334 produces harder, more ambiguous examples, on average.

Sentences generated by the adversarial classifier 334 can be used to evaluate robustness of the TLC 112 and generate sentences to attack the TLC 112. Fine-tuning the TLC 112 based on the sentences generated by the adversarial classifier 334 can improve the performance on other toxicity datasets. Fine-tuning the TLC 112 can include providing supervised input-output examples generated using the adversarial classifier 334 in the loop and which confused the TLC 112. These examples help the TLC 112 learn a more nuanced understanding of what is toxic and not toxic for improved classification after deployment.

The adversarial classifier 334 can be used to challenge a content filter via an adversarial game between two artificial intelligence (AI) systems. Embodiments and similar approaches can be leveraged to improve content filters and prevent large scale attacks against sensitive platforms. Improving the TLC to include fewer machine biases is helpful to combat online harm. Without such systems, minority groups are likely to be targeted by current (biased) systems. The adversarial classifier 334 is a significant step towards advancing this toxicity classification task.

Embodiments can include receiving user content that is potentially toxic. The user content can include text. An enhanced TLC can be provided, received, or otherwise accessed. The enhanced TLC previously improved by leveraging an adversarial classifier configured to choose words that are more likely misclassified by the TLC before enhancing the TLC. The TLC can be enhanced using operations and methods discussed herein to generate phrases that are likely confusing to the TLC and then training the TLC based on the generated phrases. The enhanced TLC can operate on the received user content to generate an output indicating whether the user content is toxic. The output of the enhanced TLC can be used to identify user content as toxic or non-toxic. Action, such as removing the user content from a website, a document, or the like, can be taken (e.g., automatically-without user interference) against identified toxic content.

AI is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as text prediction, toxicity classification, content filtering, or the like. The TLC 112 or PLM 220 can include one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process, which can be improved using phrases generated by the adversarial classifier 334 playing an adversarial game between the TLC 112 and the PLM 220, may be used to determine appropriate weights by selecting initial weights.

In some examples, initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 8:
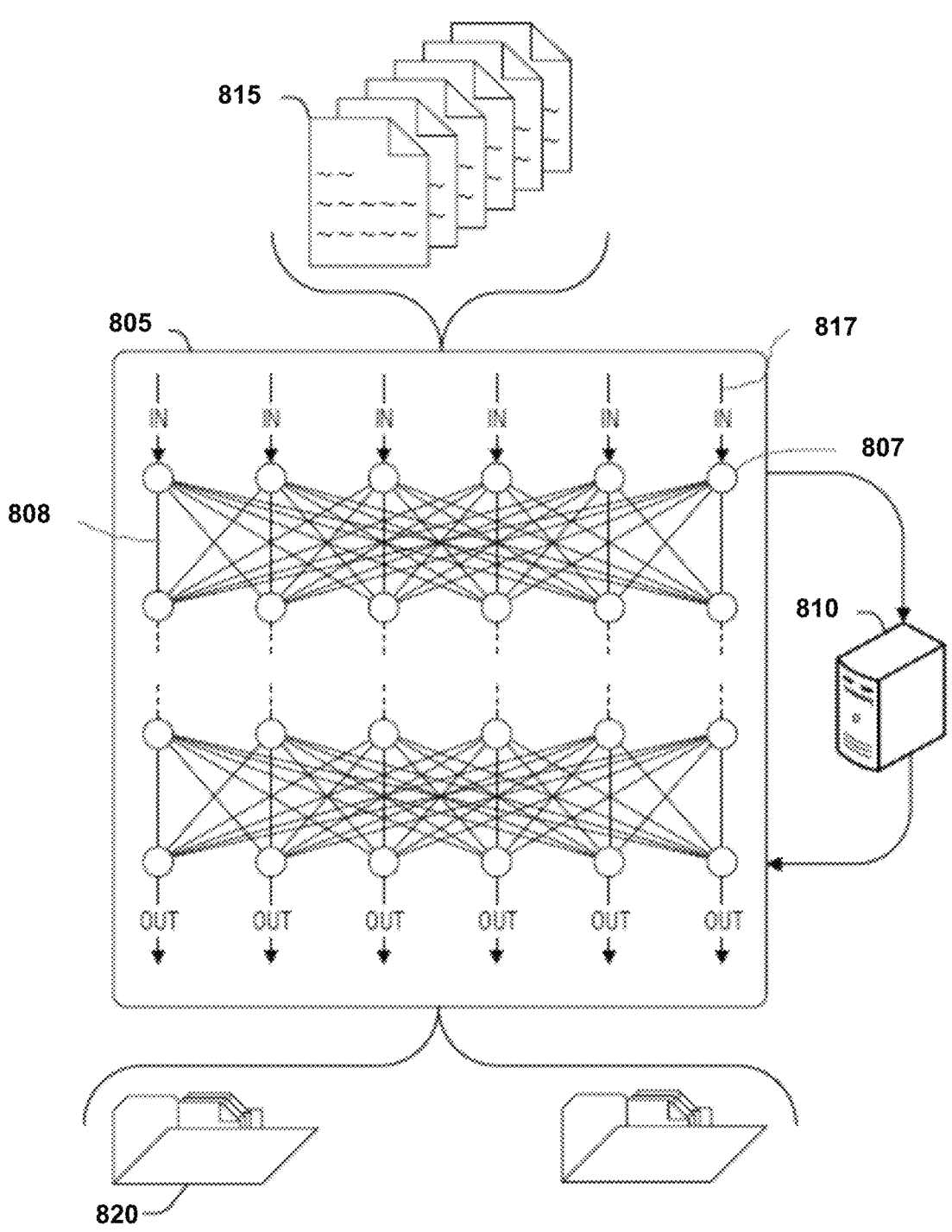
FIG. 8 is a block diagram of an example of an environment including a system for neural network training.

FIG. 8 is a block diagram of an example of an environment including a system for neural network training. The system includes an artificial NN (ANN) 805 that is trained using a processing node 810. The processing node 810 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 805, or even different nodes 807 within layers. Thus, a set of processing nodes 810 is arranged to perform the training of the ANN 805.

The set of processing nodes 810 is arranged to receive a training set 815 for the ANN 805 (e.g., that includes a phrase generated using the adversarial classifier 334). The ANN 805 comprises a set of nodes 807 arranged in layers (illustrated as rows of nodes 807) and a set of inter-node weights 808 (e.g., parameters) between nodes in the set of nodes. In an example, the training set 815 is a subset of a complete training set. Here, the subset may enable processing nodes with limited storage resources to participate in training the ANN 805.

The training data may include multiple numerical values representative of a domain, such as a word, symbol, number, other part of speech, or the like. Each value of the training or input 817 to be classified after ANN 805 is trained, is provided to a corresponding node 807 in the first layer or input layer of ANN 805. The values propagate through the layers and are changed by the objective function.

As noted, the set of processing nodes is arranged to train the neural network to create a trained neural network. After the ANN is trained, data input into the ANN will produce valid classifications 820 (e.g., the input data 817 will be assigned into categories), for example. The training performed by the set of processing nodes 807 is iterative. In an example, each iteration of the training the ANN 805 is performed independently between layers of the ANN 805. Thus, two distinct layers may be processed in parallel by different members of the set of processing nodes. In an example, different layers of the ANN 805 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 807 (e.g., neurons) are trained independently. In an example, the nodes are trained on different hardware.

Figure 9:
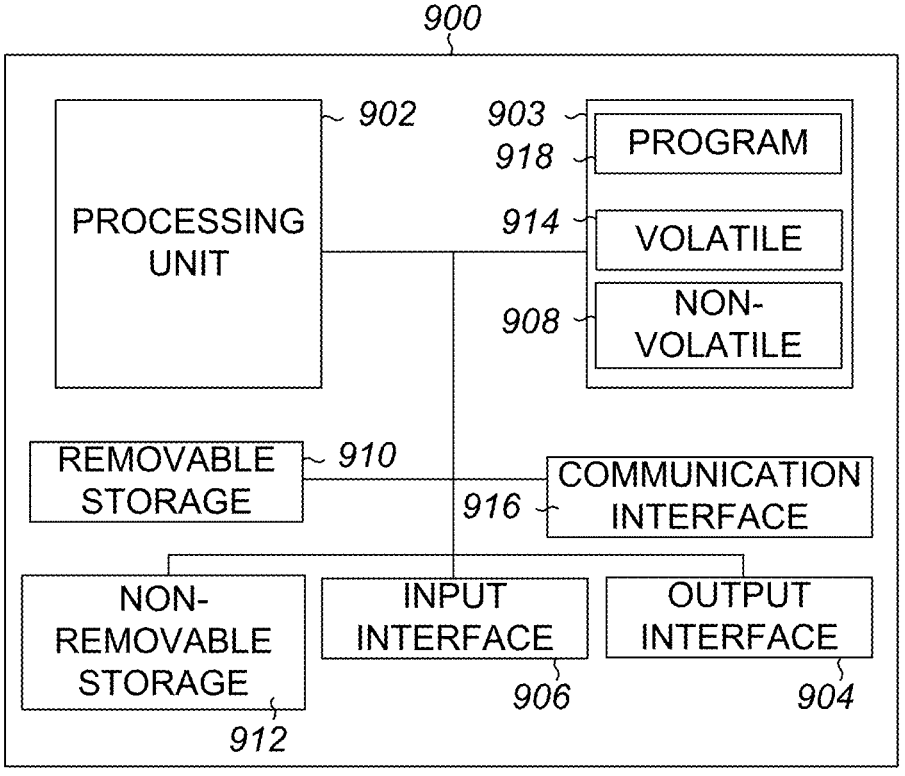
FIG. 9 illustrates, by way of example, a block diagram of an embodiment of a machine (e.g., a computer system) to implement one or more embodiments.

FIG. 9 illustrates, by way of example, a block diagram of an embodiment of a machine 900 (e.g., a computer system) to implement one or more embodiments. The client device 106, adversarial classifier 334, TLC 112, PLM 220, or a component thereof can include one or more of the components of the machine 900. One or more of the client device 106, method 300, 700, adversarial classifier 334, TLC 112, PLM 220, or a component or operations thereof can be implemented, at least in part, using a component of the machine 900. One example machine 900 (in the form of a computer), may include a processing unit 902, memory 903, removable storage 910, and non-removable storage 912. Although the example computing device is illustrated and described as machine 900, the computing device may be in different forms in different embodiments. For example, the computing device may instead be a smartphone, a tablet, smartwatch, or other computing device including the same or similar elements as illustrated and described regarding FIG. 9. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 903 may include volatile memory 914 and non-volatile memory 908. The machine 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 900 may include or have access to a computing environment that includes input 906, output 904, and a communication connection 916. Output 904 may include a display device, such as a touchscreen, that also may serve as an input device. The input 906 may include one or more of a touchscreen, touchpad, mouse, keyboard, camera, one or more device-specific buttons, one or more sensors integrated within or coupled via wired or wireless data connections to the machine 800, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 902 (sometimes called processing circuitry) of the machine 900. A hard drive, CD-ROM, and RAM are some examples of articles including a non-transitory computer-readable medium such as a storage device. For example, a computer program 918 may be used to cause processing unit 902 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

ADDITIONAL NOTES AND EXAMPLES

Example 1 can include a method for generating a phrase that is confusing for a language classifier (LC), the method comprising determining, by the LC, a first classification score (CS) of a prompt indicating whether the prompt is a first class or a second class, predicting, based on the prompt and by a pre-trained language model (PLM), likely next words and a corresponding probability for each of the likely next words, determining, by the LC, a second CS for each of the likely next words, determining, by an adversarial classifier, respective scores for each of the likely next words, the respective scores determined based on the first CS of the prompt, the second CS of the likely next words, and the probabilities of the likely next words, and selecting, by an adversarial classifier, a next word of the likely next words based on the respective scores.

In Example 2, Example 1 further includes, wherein the respective scores are determined so the adversarial classifier selects the next word to generate a phrase that is more likely the first class if the first CS indicates the prompt is more likely the second class and generate a phrase that is more likely the second class if the first CS indicates the prompt is more likely the first class.

In Example 3, Example 2 further includes, wherein selecting the next word includes selecting the next word that maximizes a mathematical combination of the second CS and one minus the probability if the first CS indicates the prompt is more likely the second class and maximizes a mathematical combination of the second CS and the probability if the first CS indicates the prompt is more likely the first class.

In Example 4, Example 3 further includes, wherein the second CS and the probability, or one minus the probability, are weighted to balance intelligibility and confusion of the phrase.

In Example 5, at least one of Examples 1-4 further includes training the LC based on the phrase.

In Example 6, at least one of Examples 1-5 further includes, wherein the PLM is an autoregressive language model.

In Example 7, at least one of Examples 1-6 further includes, wherein generating the phrase includes iterating through N words, from a first level to an Nth level, of a beam search tree by predicting, based on an ith selected word and by the PLM, likely next words and a corresponding probability for each of the likely next words, determining, by the LC, the second CS for each of the likely next words, determining, by an adversarial classifier, respective scores for each of the likely next words, selecting the next word of the likely next words based on the respective scores, and iterating to generate a next word of the phrase based on a third CS of the selected next word.

In Example 8, at least one of Examples 1-7 further includes, wherein the LC is a toxic language classifier (TLC), the first class is neutral and the second class is toxic.

Example 9 includes a compute system comprising a memory, processing circuitry coupled to the memory, the processing circuitry configured to perform the operations of the method of at least one of Examples 1-8.

Example 10 includes a machine-readable medium including instructions that, when executed by a machine, cause the machine to perform operations of the method of at least one of Examples 1-8.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for generating a phrase that is confusing for a language classifier (LC), the method comprising:
   receiving from the LC, a first classification score (CS) of a prompt;
   iteratively performing operations to generate a confusing prompt used for training another language classifier model, the operation comprising:
   receiving, by a classifier, input including:

the first CS, from a language model (LM) and based on a next word of the prompt, predicted likely next words for the prompt, and corresponding probabilities for the predicted likely next words, from the LC and based on the predicted likely next words, a second CS of the predicted likely next words, the first and second CS indicate whether the prompt and the predicted likely next words are a first class or a second class, respectively;

determining, by the classifier and based on the input, respective confusion scores for the predicted likely next words;

selecting, by the classifier, a likely next word of the predicted likely next words associated with a maximum confusion score of the respective confusion scores; and appending the selected likely next word to the confusing prompt.

2. The method of claim 1, wherein the respective scores are determined so the classifier selects the next word to generate a phrase that is more likely the first class if the first CS indicates the prompt is more likely the second class and generate a phrase that is more likely the second class if first CS indicates the prompt is more likely the first class.

3. The method of claim 2, wherein selecting the next word includes selecting the next word that maximizes a mathematical combination of the second CS and one minus the probability if the first CS indicates the prompt is more likely the second class and maximizes a mathematical combination of the second CS and the probability if the first CS indicates the prompt is more likely the first class.

4. The method of claim 3, wherein the second CS and the probability, or one minus the probability, are weighted to balance intelligibility and confusion of the phrase.

5. The method of claim 2, further comprising training the LC based on the phrase.

6. The method of claim 1, wherein generating the phrase includes iterating through N words, from a first level to an Nth level, of a beam search tree by:

predicting, based on an ith selected word, likely next words and a corresponding probability for each of the likely next words;

determining the second CS for each of the likely next words;

determining, by the classifier, respective scores for each of the likely next words;

selecting the next word of the likely next words based on the respective scores; and iterating to generate a next word of the phrase based on a third CS of the selected next word.

7. The method of claim 1, wherein the likely next words are top-k next words.

8. A compute system comprising:

a memory;

processing circuitry coupled to the memory, the processing circuitry configured to:

receiving from a language classifier (LC), a first classification score (CS) of a prompt;

iteratively performing operations to generate a confusing prompt used for training another language classifier model, the operations comprising:

receiving, by a classifier, input including the first CS and:

from a language model (LM) and based on a next word of the prompt, predicted likely next words for the prompt, and corresponding probabilities for the predicted likely next words, from the LC and based on the predicted likely next words, a second CS of the predicted likely next words, the first and second CS indicate whether the prompt and the predicted likely next words are a first class or a second class, respectively;

determining, by the classifier and based on the input, respective confusion scores for the predicted likely next words:

selecting, by the classifier, a likely next word of the predicted likely next words associated with a maximum confusion score of the respective confusion scores; and appending the selected likely next word to the confusing prompt.

9. The compute system of claim 8, wherein the respective scores are determined so the classifier selects the next word to generate a phrase that is more likely the first class if the first CS indicates the prompt is more likely the second class and generate a phrase that is more likely the second class if the first CS indicates the prompt is more likely the first class.

10. The compute system of claim 9, wherein selecting the next word includes selecting the next word that maximizes a mathematical combination of the second CS and one minus the probability if the first CS indicates the prompt is more likely the second class and maximizes a mathematical combination of the second CS and the probability if the first CS indicates the prompt is more likely the first class.

11. The compute system of claim 10, wherein the second CS and the probability, or one minus the probability, are weighted to balance intelligibility and confusion of the phrase.

12. The compute system of claim 9, wherein the processing circuitry is further configured to train a language classifier (LC) based on the phrase.

13. The compute system of claim 9, wherein generating the phrase includes iterating through N words, from a first level to an Nth level, of a beam search tree by:

predicting, based on an ith selected word, likely next words and a corresponding probability for each of the likely next words;

determining the second CS for each of the likely next words;

determining, by the classifier, respective scores for each of the likely next words;

selecting the next word of the likely next words based on the respective scores; and iterating to generate a next word of the phrase based on a third CS of the selected next word.

14. The compute system of claim 8, wherein the likely next words are top-k next words.

15. A machine-readable medium including instructions that, when executed by a machine, cause the machine to perform operations comprising:

receiving from a language classifier (LC), a first classification score (CS) of a prompt;

iteratively performing operations to generate a confusing prompt used for training another language classifier model, the operations comprising:

receiving, by a classifier, input including the first CS and:

from a language model (LM) and based on a next word of the prompt, predicted likely next words for the prompt, and corresponding probabilities for the predicted likely next words, from the LC and based on the predicted likely next words, a second CS of the predicted likely next words, the first and second CS indicate whether the prompt and the predicted likely next words are a first class or a second class, respectively;

determining, by the classifier and based on the input, respective confusion scores for the predicted likely next words;

selecting, by the classifier, a likely next word of the predicted likely next words associated with a maximum confusion score of the respective confusion scores; and appending the selected likely next word to the confusing prompt.

16. The machine-readable medium of claim 15, wherein the respective scores are determined so the classifier selects the next word to generate a phrase that is more likely the first class if the first CS indicates the prompt is more likely the second class and generate a phrase that is more likely the second class if the first CS indicates the prompt is more likely the first class.

17. The machine-readable medium of claim 16, wherein selecting the next word includes selecting the next word that maximizes a mathematical combination of the second CS and one minus the probability if the first CS indicates the prompt is more likely the second class and maximizes a mathematical combination of the second CS and the probability if the first CS indicates the prompt is more likely the first class.

18. The machine-readable medium of claim 17, wherein the second CS and the probability, or one minus the probability, are weighted to balance intelligibility and confusion of the phrase.

19. The machine-readable medium of claim 16, wherein the operations further comprise training a language classifier based on the phrase.

20. The machine-readable medium of claim 16, wherein generating the phrase includes iterating through N words, from a first level to an Nth level, of a beam search tree by:

predicting, based on an ith selected word, likely next words and a corresponding probability for each of the likely next words;

determining the second CS for each of the likely next words;

determining, by the classifier, respective scores for each of the likely next words;

selecting the next word of the likely next words based on the respective scores; and iterating to generate a next word of the phrase based on a third CS of the selected next word.

* * * * *